United States Patent
Dazzi

(10) Patent No.: US 11,237,105 B2
(45) Date of Patent: Feb. 1, 2022

(54) SYSTEM FOR MEASURING THE ABSORPTION OF A LASER EMISSION BY A SAMPLE

(71) Applicants: Centre National De La Recherche Scientifique, Paris (FR); Universite Paris-SUD 11, Orsay (FR)

(72) Inventor: Alexandre Dazzi, Orsay (FR)

(73) Assignees: Centre National De La Recherche Scientifique, Paris (FR); Universite Paris-Saclay, Gif-sur-Yvette (FR)

( * ) Notice: Subject to any disclaimer, the term of this patent is extended or adjusted under 35 U.S.C. 154(b) by 0 days.

(21) Appl. No.: 17/273,814

(22) PCT Filed: Sep. 4, 2019

(86) PCT No.: PCT/EP2019/073600
§ 371 (c)(1),
(2) Date: Mar. 5, 2021

(87) PCT Pub. No.: WO2020/049053
PCT Pub. Date: Mar. 12, 2020

(65) Prior Publication Data
US 2021/0341385 A1    Nov. 4, 2021

(30) Foreign Application Priority Data

Sep. 6, 2018 (FR) ..................................... 1858000
Oct. 19, 2018 (FR) ..................................... 1859683

(51) Int. Cl.
*G01Q 60/34* (2010.01)
*G01N 21/39* (2006.01)
(Continued)

(52) U.S. Cl.
CPC .............. *G01N 21/39* (2013.01); *G01Q 30/02* (2013.01); *G01Q 60/34* (2013.01); *G01Q 60/363* (2013.01); *G01N 2201/0697* (2013.01)

(58) Field of Classification Search
CPC . G01Q 30/02; G01Q 60/34–363; G01N 21/39
See application file for complete search history.

(56) References Cited

U.S. PATENT DOCUMENTS

| 8,680,467 | B2 | 3/2014 | Prater et al. | |
| 2008/0283755 | A1 | 11/2008 | Dazzi et al. | |
| 2011/0231966 | A1* | 9/2011 | Passian | G01Q 60/32 |
| | | | | 850/21 |

FOREIGN PATENT DOCUMENTS

WO    WO 2018/039255 A1    3/2018

OTHER PUBLICATIONS

Dazzi, Alexandre, et al., "AFM-IR: Technology and Applications in Nanoscale Infrared Spectroscopy and Chemical Imaging", Chemical Reviews, Dec. 13, 2016, pp. 5146-5173, vol. 117, No. 7, ACS Publications, US.
(Continued)

*Primary Examiner* — Eliza W Osenbaugh-Stewart
(74) *Attorney, Agent, or Firm* — Alston & Bird LLP

(57) ABSTRACT

A system for measuring the absorption of a laser radiation by a sample is provided. The system comprises: •(i) a pulsed laser source, suitable for emitting pulses at a repetition frequency $f_l$ and arranged so as to illuminate the sample; •(ii) an AFM probe arranged so as to be able to be placed in contact with the region of the surface of the sample on one side, the AFM probe having a mechanical resonance mode at a frequency $f_m$; and •(iii) a detector configured to measure the amplitude of the oscillations of the AFM probe resulting from the absorption of the laser radiation by the region of the surface of the sample, characterized in that it also comprises (Continued)

a translation system designed to displace the sample at a frequency $f_p$.

13 Claims, 4 Drawing Sheets

(51) Int. Cl.
  *G01Q 60/36* (2010.01)
  *G01Q 30/02* (2010.01)

(56) References Cited

OTHER PUBLICATIONS

Cuberes, M. T., et al., "Heterodyne Force Microscopy of PMMA/rubber Nanocomposites: Nanomapping of Viscoelastic Response at Ultrasonic Frequencies", Journal of Physics D: Applied Physics, pp. 2347-2355, vol. 33, IOP Publishing Ltd., UK.

International Searching Authority, International Search Report (ISR) and Written Opinion received for International Application No. PCT/EP2019/073600, dated Nov. 11, 2019, 13 pages, European Patent Office, Netherlands.

National Industrial Property Institute, Search Report and Written Opinion for French Application No. 1858000, dated Jul. 8, 2019, 7 pages, Republic of France.

Tomoda, M., et al., "Local probing of thermal properties at submicron depths with megahertz photothermal vibration", Applied Physics Letters, Jan. 27, 2003, pp. 622-624, vol. 82, No. 4, American Institute of Physics, US.

Wang, Le, et al., "Nanoscale simultaneous chemical and mechanical imaging via peak force infrared microscopy", Science Advances, Jun. 23, 2017, 11 pages, vol. 3, No. 6, id. e1700255, American Association for the Advancement of Science, US.

\* cited by examiner

SYSTEM FOR MEASURING THE ABSORPTION OF A LASER EMISSION BY A SAMPLE

A system for measuring the absorption of a laser radiation by a sample is provided. The system comprises: •(i) a pulsed laser source, suitable for emitting pulses at a repetition frequency $f_l$ and arranged so as to illuminate the sample; •(ii) an AFM probe arranged so as to be able to be placed in contact with the region of the surface of the sample on one side, the AFM probe having a mechanical resonance mode at a frequency $f_m$; and •(iii) a detector configured to measure the amplitude of the oscillations of the AFM probe resulting from the absorption of the laser radiation by the region of the surface of the sample, characterized in that it also comprises a translation system designed to displace the sample at a frequency $f_p$. A system for measuring the absorption of a laser radiation by a sample (10) comprising: •(i) a pulsed laser source (2), suitable for emitting pulses at a repetition frequency $f_l$ and arranged so as to illuminate the sample; •(ii) an AFM probe arranged so as to be able to be placed in contact with the region of the surface of the sample (3) on one side, the AFM probe having a mechanical resonance mode at a frequency $f_m$; and •(iii) a detector (8) configured to measure the amplitude of the oscillations of the AFM probe resulting from the absorption of the laser radiation by the region of the surface of the sample (3), characterized in that it also comprises a translation system designed to displace the sample at a frequency $f_p$.

CROSS-REFERENCE TO RELATED APPLICATIONS

The present application is a national phase entry of PCT/EP2019/073600, filed on Sep. 4, 2019, which claims the benefit of priority of French Patent Application No. 1858000, filed Sep. 6, 2018, and French Patent Application No. 1859683, filed Oct. 19, 2018, the entire contents of which are hereby incorporated by reference in their entirety for all purposes.

TECHNICAL FIELD

The invention relates to the field of atomic force microscopy. More particularly, it relates to a system for measuring the absorption of a laser radiation by a sample with a nanometric or subnanometric spatial resolution comprising an acoustic modulator and a method using this system.

BACKGROUND

Since their development during the 17th century, the resolution of optical microscopes has only continued to improve by virtue of technological progress, notably through the advances in the manufacturing and design of lens systems to go beyond the limits of microscopic observation. Direct observation of objects using light forms, by its simplicity, the main force of optical microscopy, but it is also its greatest weakness. On the scale where the objects reach a dimension close to the illumination wavelength, the phenomenon of diffraction makes it difficult, even impossible, to observe details of less than a few hundreds of nanometers.

One way of circumventing this diffraction limit is to not use the light as direct observation means. Atomic force microscopy (AFM) thus allows the limits set by the diffraction to be overcome and allows access to a level of detail hitherto unrivaled but allows only the reliefs of a surface to be "visualized".

AFM allows a surface to be analyzed point-by-point using a scanning by a probe in contact or in immediate proximity to the surface of a sample and the PTIR (Photo Thermal Induced Resonance) technique, known from the document US 2008/0283,755, is a variation of this method. The expression immediate proximity is understood to mean: separated by less than 10 nanometers. This technique allows the infrared absorption of a sample to be measured by coupling an AFM with a pulsed tunable infrared laser (IR). The advantage of this approach is being able to measure an infrared spectrum on the scale of a few nanometers, thus exceeding the conventional resolution limits of microscopes. The local measurement of the infrared absorption can be done by means of the tip of an AFM probe in contact with the region of the sample illuminated by the IR laser. In fact, when the wavelength of the laser corresponds to an absorption band of the sample, the energy of the infrared light absorbed is directly converted into heat which is translated into an increase in temperature. The sample therefore heats up and expands rapidly for laser firings of a few tens of nanoseconds. The tip of the AFM, located in contact with the sample, will undergo a thrust (or an impact) and make the lever of the AFM vibrate. By measuring the amplitude of the oscillations of the lever of the AFM, it is possible to work back to the measurement of the absorption (by a direct measurement or by an FFT analysis of the oscillations).

Moreover, the oscillation of the lever is composed of numerous fundamental vibration modes and, when the lever undergoes an impact, it oscillates over all its fundamental modes. One way of making the measurement of the absorption more effective is to excite just one fundamental mode of the lever by making it resonate. To do that, it is essential to use a laser which can change its firing frequency within the frequency range corresponding to the fundamental mode of the mode of the lever (between 50 and 2000 kHz) and with a resolution of a few tens of Hertz. That approach, that is here called "tunable PTIR", is known to the person skilled in the art (U.S. Pat. No. 8,680,467 B2).

However, currently, very few infrared lasers are tunable in terms of firing frequency and wavelength. Only the QCL (Quantum Cascade Laser) technology allows this approach which greatly limits the extent of the measurable absorption spectrum and the field of application of this method. Indeed, QCLs generate only radiations with wavelengths greater than 3 μm.

The invention aims to extend the measurable absorption spectrum by the tunable PTIR technique and therefore to widen the field of application thereof by overcoming the constraint inherent in the use of firing frequency-tunable lasers.

SUMMARY

To this end, the invention proposes a system for measuring the absorption of a laser radiation by a sample with a nanometric or subnanometric spatial resolution comprising:
(i) a pulsed laser source, suitable for emitting pulses at a tunable wavelength and at a repetition frequency $f_l$ and arranged so as to illuminate a portion of the sample so as to induce a thermal expansion of a region of the surface of the sample;
(ii) an AFM probe comprising a beam bearing an AFM tip oriented in a so-called vertical direction and arranged so as to be able to be placed in contact with the region of the surface of the sample in which a thermal expansion is induced on one side and held mechanically on another side, the AFM probe having a mechanical resonance mode at a frequency $f_m$; and (iii) a detector configured to measure the amplitude of the oscillations of the AFM probe resulting from the absorption of the laser radiation by the region of the surface of the sample, characterized in that it also comprises a piezoelectric translation system designed to displace the sample in said vertical direction, the displacement being modulated at a frequency $f_p$, and in that the detector is configured to measure the amplitude of a frequency component $f_m$ of the oscillations of the AFM probe, the frequency $f_p$ being chosen so as to generate oscillations of the AFM probe at the frequency $f_m$ by a mix of acoustic waves.

Preferred but nonlimiting aspects of the invention are as follows:

The frequency $f_p$ of modulation of the displacement of the piezoelectric translation system is the sum of or the difference between the frequencies $f_m$ and $f_l$.

The pulse repetition frequency $f_l$ is greater than half the mid-height spectral width of the mechanical resonance mode of resonance frequency $f_m$.

The pulse repetition frequency of the laser is tunable.

The pulse laser source is arranged so that the portion of the sample that is illuminated comprises the region of the surface of the sample in contact with the tip of the AFM probe.

The pulsed laser source is arranged so that the portion of the sample that is illuminated is situated on a first face of the sample, the AFM probe being arranged so that the region of the surface of the sample in contact with the AFM probe is situated on a second face, opposite the first face.

Another subject of the invention is a method for measuring the absorption of a laser radiation by a sample with a nanometric or subnanometric spatial resolution comprising the following steps:

a. illuminating a region of the surface of the sample with a pulsed laser source designed to emit pulses at a tunable wavelength and at a repetition frequency $f_l$;

b. placing an AFM probe, comprising a beam having an AFM tip oriented in a so-called vertical direction on one side and held mechanically on another side, so as to be able to place the AFM tip in contact with the illuminated region of the surface of the sample on one side, the probe having a mechanical resonance mode at a frequency $f_m$;

c. displacing the surface of the sample in said vertical direction using a piezoelectric translation system supporting the sample, the displacement being modulated at a frequency $f_p$ chosen so as to generate oscillations of the AFM probe at the frequency $f_m$ by a mix of acoustic waves, and d. detecting and measuring the amplitude of the oscillations of the AFM probe resulting from the absorption of the laser radiation by the surface.

According to particular embodiments of such a method:

The laser illuminating the region of the surface of the sample has a tunable pulse repetition frequency.

The steps a) to d) are reiterated by illuminating the region of the surface of the sample for successive and different pulse repetition frequencies $f_m$.

The steps a) to d) are reiterated by illuminating the region of the surface of the sample with successive and different illumination wavelengths to create an absorption spectrum from the measurements of the amplitudes of the oscillations of the AFM probe corresponding to said successive illumination wavelengths.

The steps a) to d) are reiterated at different regions of the surface of the sample illuminated by the laser source to create an absorption map from the measurements of the amplitudes of the oscillations of the AFM probe, said AFM probe operating in contact mode.

The AFM probe operates in peak force tapping mode.

The AFM probe operates in tapping mode.

BRIEF DESCRIPTION OF THE DRAWINGS

Other features, details and advantages of the invention will emerge on reading the description given with reference to the attached drawings given by way of example and which represent, respectively.

Hereinbelow, "vertical direction" will be understood to mean a direction parallel to the orientation of the AFM tip, and "lateral direction" will be understood to mean a direction at right angles to the vertical direction. The terms "nanometric" and "subnanometric" mean a dimension less than or equal to 100 nm, and preferably 10 nm, and less than 1 nm respectively.

DETAILED DESCRIPTION

Figure 1:
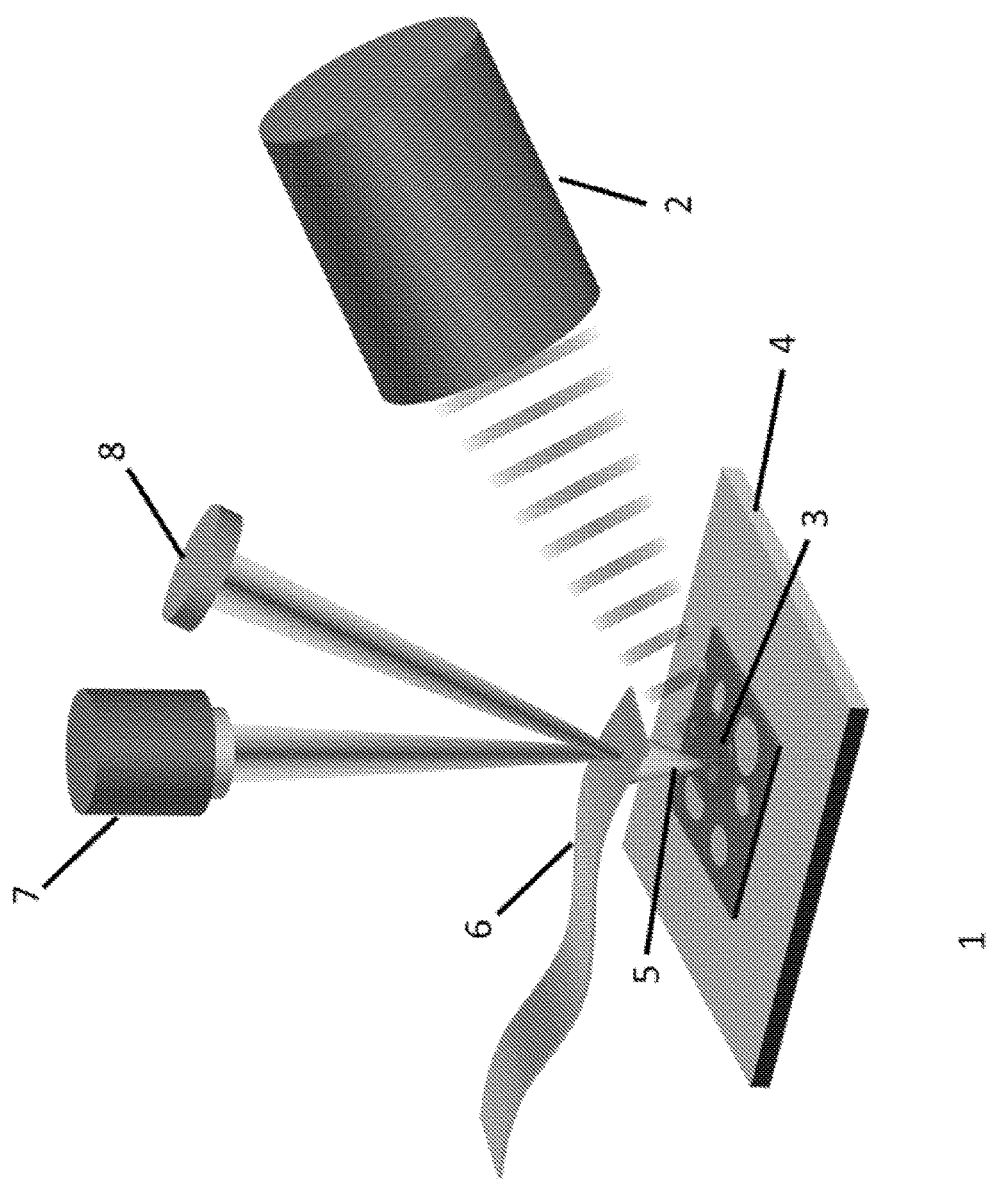
FIG. 1, a diagram of a tunable PTIR AFM known from the prior art.

FIG. 1 represents a diagram of a tunable PTIR AFM 1 known from the prior art (for example U.S. Pat. No. 8,680,467 B2). This type of AFM allows details of the sample to be measured on a nanometric scale. Laser pulses originating from an infrared laser source 2 illuminate a submicrometric region of the surface of the sample 3. If the illumination wavelength corresponds to an absorption band of the sample, a portion of the IR radiation is absorbed. The energy of this radiation will be converted into heat provoking an expansion in the form of a thermal expansion of the surface of the sample which will in turn excite resonant oscillations of an AFM probe in contact with this region. Measuring the amplitude of these oscillations makes it possible to work back to the absorption of the IR radiation by the region of the surface of the sample (see for example Dazzi, A., & Prater, C. B. (2016), *AFM-IR: technology and applications in nanoscale infrared spectroscopy and chemical imaging*, Chemical reviews, 117(7), 5146-5173). In order to measure the amplitude of these oscillations, a visible laser diode 7 generates a beam directed with a certain angle to a lever 6 of the AFM probe which is reflected to a photodetector 8 and a data processing module. Typically, the photodetector 8 is a quadrant diode and the lever of the AFM probe is placed so that the beam reflected by the lever is centered on the quadrant diode. The lever 6 generally comprises an AFM tip 5 in contact with a region of the surface of a sample 3. This AFM tip has, in some cases, a fine nanometric end. The vertical deflections of the AFM lever provoked by the contact with the sample will cause the beam to be deflected on the photodetector, thus generating a signal difference in volts between the quadrants and making it possible to work back to the amplitude of the oscillations. In the embodiment of FIG. 1, the laser source is tunable in wavelength and in pulse repetition frequency (or firing frequency). The laser source 2 can be, for example, a QCL. By performing this absorption measurement with different and successive illumination wavelengths, it is possible to obtain an absorption spectrum of a submicrometric region of the surface of the sample. A sample-holder 4 allows the sample to be translated in a direction at right angles to the vertical direction with nanometric precision. In another embodiment, it is the position of the AFM probe and that of the laser beam which is displaced while the sample remains fixed. In this embodiment, it is critical to maintain the beam/AFM tip superpositioning. By thus displacing the region of the surface of the sample illuminated by the laser source and in contact with the AFM probe and by measuring the absorption at one or more wavelengths, a spatially resolved map of the absorption of the sample is created. Such measurements allow profiles and IR absorption maps to be created and provide information on the distribution of chemical species on the surface of the sample on a nanometric scale.

As mentioned previously, in order to obtain robust spectra and absorption maps, it is desirable to maintain the oscillations of the AFM probe at a resonance frequency $f_m$ thereof during the variations of positions and other modifications of the sample. For that, the embodiment of FIG. 1 uses techniques known from the prior art (see for example the document U.S. Pat. No. 8,680,467 B2) to determine resonance frequencies of the AFM probe $f_m$ and then adjust the firing frequency $f_l$ of the laser source so that it corresponds to the frequency $f_m$. The adjustment of the frequency $f_l$ allows optimal absorption detection conditions to be maintained over a wide range of experimental conditions. However, the need to have to adjust this frequency by several kHz in less than a second, in some conditions, limits the laser sources that allow this method to be applied to QCLs.

Figure 2:
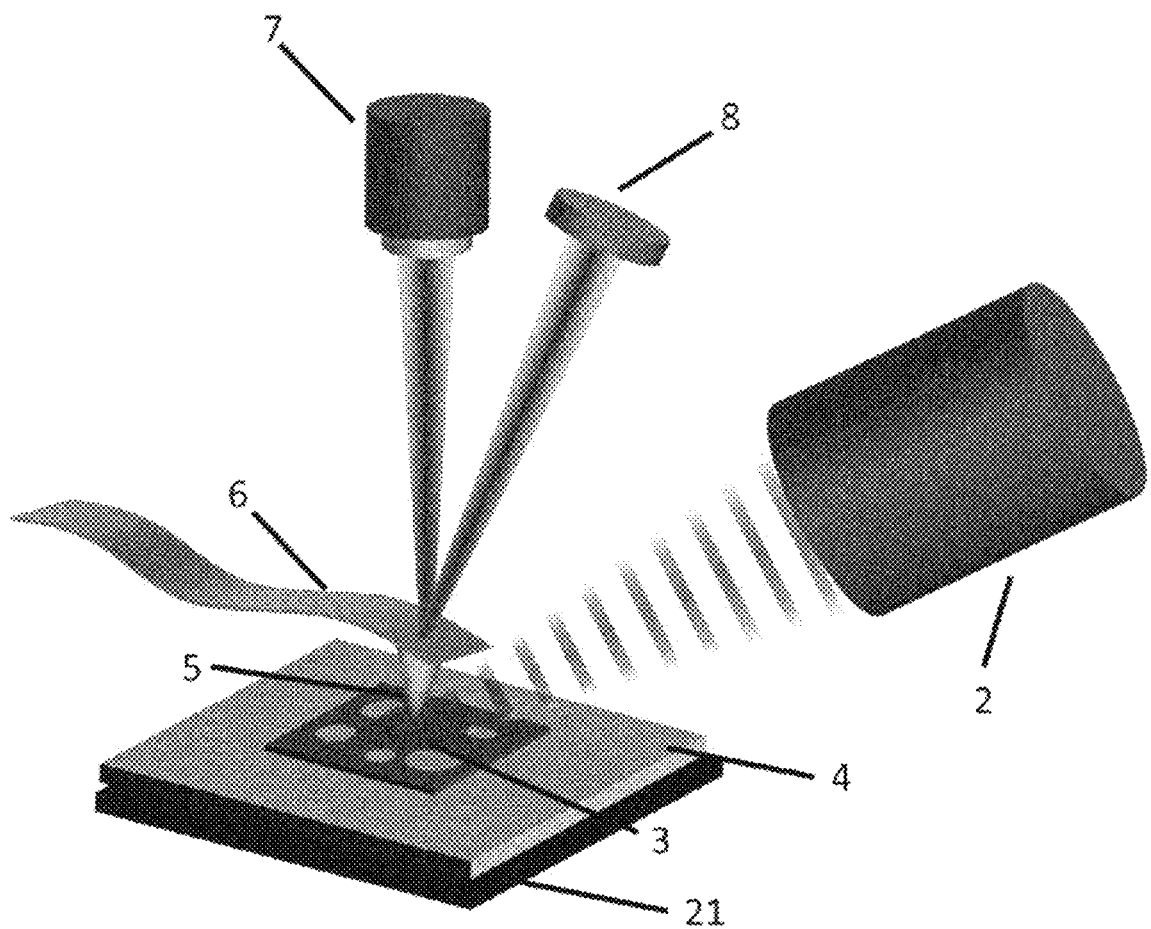
FIG. 2, a diagram of a system for measuring the absorption of a laser radiation by a sample with a nanometric or subnanometric spatial resolution according to an embodiment of the invention.

To overcome this limitation, the invention uses a system 10 for measuring the absorption of a laser radiation by a sample with a nanometric spatial resolution, one embodiment of which is illustrated in FIG. 2. Compared to the prior art, the system 10 additionally comprises a piezoelectric translation system 21 designed to displace the sample in a vertical direction, also called acoustic modulator. The embodiment of FIG. 2 uses a wavelength-tunable pulsed laser source but one that does not necessarily have an adjusted pulse repetition frequency. The piezoelectric translation system receives an electrical current suitable for producing a displacement in a vertical direction, the amplitude of which is modulated at a frequency $f_p$ such that: $f_m=f_p+f_l$. By the modulation of the displacement movement of the sample produced by the system 10, it will be possible to produce a mix of acoustic waves between the waves generated by the laser and those generated by the acoustic modulator (Cuberes, Teresa & Assender, Hazel & Briggs, George & Kolosov, Oleg. (2000), *"Heterodyne Force Microscopy of PMMA/rubber Nanocomposites: Nanomapping of Viscoelastic Response at Ultrasonic Frequencies."* Journal of Physics D: Applied Physics. 33. 2347). That is made possible by playing with the nonlinear nature of the elastic properties of the samples by defining a second order elasticity 2 of the elastic modulus. This process is similar to the frequency sum in nonlinear optics. Thus, oscillations of the lever are generated at the frequency $f_m=f_p+f_l$ and the absorption of the laser radiation is determined from these oscillations which provoke deflections of the beam on the photodetector, that are analyzed by the data processing module. In a way similar to the embodiment of FIG. 1, in the device of FIG. 2 it is necessary to determine the resonance frequencies of the AFM probe before the data are taken. In another embodiment, the acoustic modulation frequency $f_p$ is chosen so that the oscillations of the lever are generated at a frequency $f_m=f_p-f_l$. In another embodiment, the acoustic modulation frequency $f_p$ is chosen so that the oscillations of the lever are generated at a frequency $f_m=\alpha.f_p+\beta.f_l$ with $(\alpha,\beta)\in\mathbb{R}^{2*}$.

In the embodiment of FIG. 2, it is possible to produce absorption spectra of a submicrometric region of the surface of a sample by repeating absorption measurements of the same region while changing the illumination wavelength of the tunable pulsed laser source 2 without there being a need to modify the pulse repetition frequency $f_l$.

Furthermore, the device of FIG. 2 allows spatially resolved maps or absorption "images" to be obtained by displacing, in a lateral direction, the region of the surface of the sample that is illuminated by the laser source and in contact with the AFM probe in measuring the absorption of these regions. In this embodiment, the AFM probe operates in contact mode, that is to say that it is in virtually constant contact with the surface of the sample.

In another embodiment, the probe operates in PFT (peak force tapping) mode. This mode of operation allows a contact between the AFM tip and the controlled sample for each PFT cycle. The PFT cycles are synchronized at a frequency equal to twice the laser firing frequency. This technique is known from the prior art (see Wang, Le, et al. "Nanoscale simultaneous chemical and mechanical imaging via peak force infrared microscopy." Science advances 3.6 (2017)). As in the embodiment of FIG. 2, the photodiode records the deflections of the AFM lever as a function of time. The expansion of the volume of the region of the sample illuminated by the laser will persist for a certain time before reverting to normal through the thermal conduction of the heat to the environment. The difference between the two deflection plots (expansion of the volume and return to the initial volume) produced by the deflections of the lever is obtained by subtraction, giving the PF ("peak force") plot.

This method makes it possible to avoid the problems linked to the lateral contact forces and to the "dragging" of the AFM tip over the surface of the sample and is particularly appropriate for studying sticky, very small and/or very brittle samples.

In the embodiment of FIG. 2, the laser source 2 is a tunable wavelength source the firing frequency $f_l$ of which is fixed and sufficiently high for the frequency $f_m=f_p+f_l$ or $f_m=f_p-f_l$ to be a resonance frequency of the AFM probe without the frequency $f_p$ so being. Preferentially, $f_m$ can be defined as the center frequency of the resonance mode of the AFM probe. Thus, if the mid-height spectral width of the resonance mode of the lever is defined as $\Delta f_m$, the frequency $f_l$ must be such that $f_l>\Delta f_m/2$ in order to ensure that $f_p$ is not within the resonance peak of the probe of center frequency $f_m$ when $f_p+f_l$ or $f_p-f_l$ is. In some controlled environments (for example in a vacuum) and/or by improving the resonance quality factor of the probe, it is possible to reduce the mechanical damping and obtain resonance modes that have mid-height spectral widths of less than or equal to 1 kHz, even a few hundreds of Hertz. Thus, in one embodiment, $f_l$ is greater than 500 Hz. In another embodiment: $f_l>10$ kHz. In another embodiment: $f_l>20$ kHz. In the embodiment of FIG. 2, the laser source 2 is an OPO system with a firing frequency $f_i$=20 kHz. In another embodiment, the laser source 2 is a pulsed continuum laser or QCLs.

In another embodiment in which the laser source is a QCL, the device allows absorption measurements to be performed by illuminating the region of the surface of the sample 3 for successive and different pulse repetition frequencies $f_i$ and acoustic modulation frequencies $f_p$, and so that the sum of (or respectively the difference between) $f_p$ and $f_i$ is constant and equal to one and the same resonance frequency of the AFM probe $f_m$. Indeed, increasing the firing frequency $f_i$ makes it possible to induce photothermic effects which localize the thermal diffusion effects close to the surface and therefore allow the absorption to be measured in this zone. Conversely, reducing the firing frequency allows for a greater thermal diffusion and therefore information on the absorption to be obtained in a deeper zone of the illuminated region of the sample. This variation of the frequencies $f_i$ and $f_p$ therefore allows a mapping of the chemical species of the sample to be produced with different sample thicknesses.

Moreover, another advantage obtained by the coupling of the use of a QCL with the piezoelectric translation system is that it makes it possible to increase the intrinsic resolution of the tunable AFM-PTIR technique. Indeed, it is possible to use the QCL lasers with a firing frequency $f_i$ that is too high to be a resonance frequency $f_m$ of the AFM probe—which would not therefore be able to be used to perform absorption measurements with the device of FIG. 1—and to use a displacement modulation frequency $f_p$ so that the frequency $f_m = f_i - f_p$, is a resonance frequency of the AFM probe. As explained previously, operating with a high firing frequency makes it possible to generate thermal waves at high frequencies thus limiting the diffusion effects of the heat. This effect allows the thermal expansion effect to be accurately localized and therefore a better spatial resolution to be obtained on the sample absorption measurement. In an alternative embodiment to that of the device of FIG. 2, the firing frequency of the QCL source $f_i$=2 MHz—too high to be a resonance frequency of the AFM probe—and the piezoelectric translation system is configured for it to produce an acoustic modulation frequency $f_p$=1.85 MHz so as to make the AFM probe oscillate at a resonance frequency of $f_m$=150 kHz.

The embodiment of FIG. 2 also allows the measurement of sample absorption of laser radiation in an aqueous medium. Indeed, the mix of acoustic wave being a nonlinear process, the susceptibility of the surface of the sample which is solid is different that of water which is liquid. Indeed, the water absorbs laser radiation (apart from the wavelengths within the window of the water) and degrades the signal-to-noise ratio linked to the acoustic signal originating from the sample. Using the system of FIG. 2, it is therefore possible to determine and eliminate the contribution of the absorption of the water in the signals detected by the photodetector and analyzed by the data processing module, and therefore to determine the share of the absorption of the radiation due to the sample.

In fact, the frequency-sum and frequency-difference signal generated by the embodiment of FIG. 2 is proportional to the second order elasticity 2 of the elastic modulus of the sample. The water, which surrounds the AFM tip and the sample, is also lit by the tunable laser and will therefore expand and provoke an acoustic wave at the laser firing frequency. This acoustic wave will also generate a sum and difference signal with the acoustic waves from the piezoelectric system 21 but which will be very weak because the nonlinear part of elastic modulus of the water which is liquid is negligible compared to that of the sample which is solid.

Figure 3:
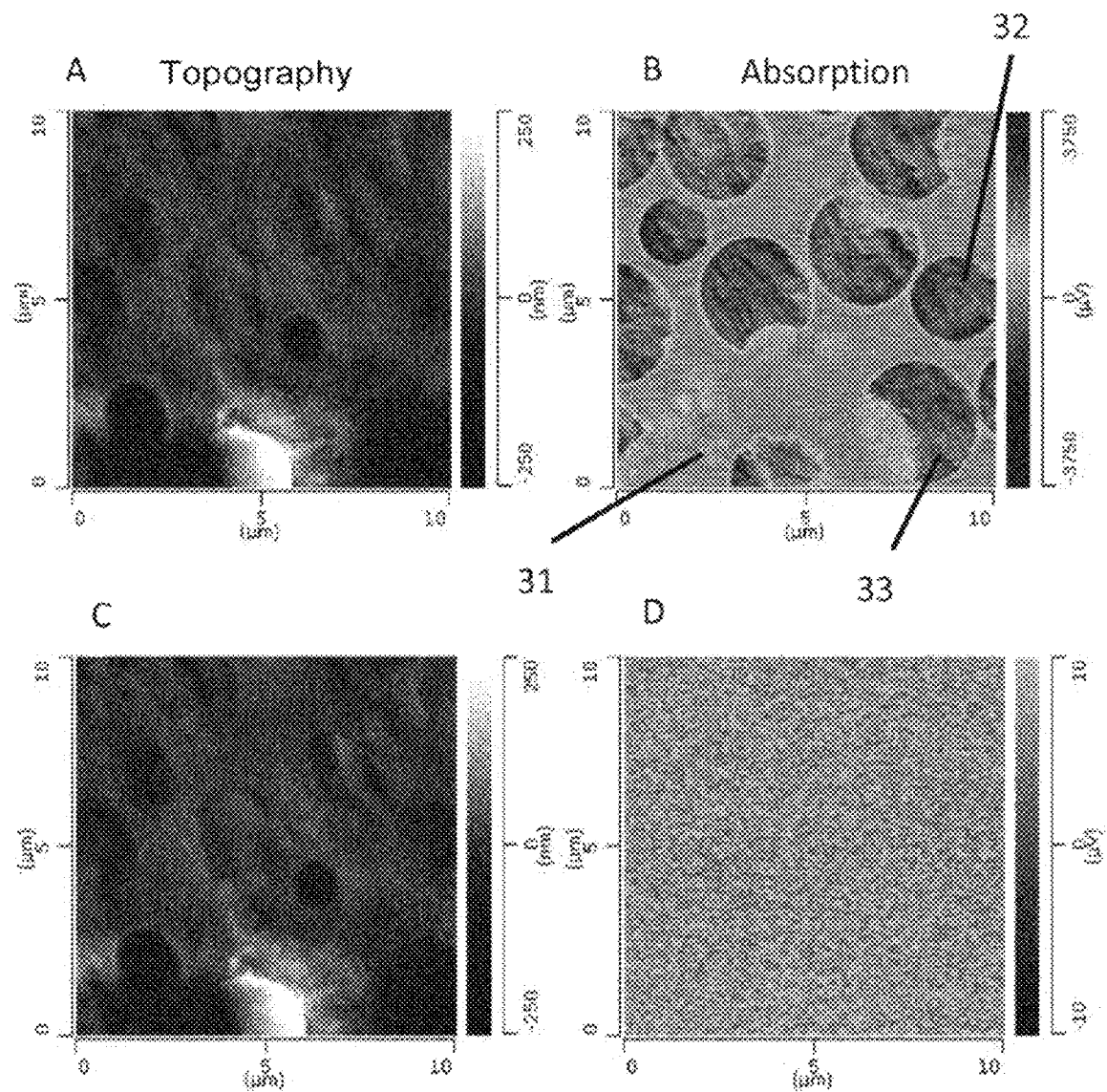
FIG. 3, a topographic map and an absorption map of a test sample in two different conditions.

FIG. 3 presents two topographic maps (A and C) and two absorption maps (B and D) of a test sample obtained with a tunable PTIR AFM similar to that of the embodiment of FIG. 2. The images C and D are obtained by analyzing the same frequencies of the photodiode as the images A and B respectively and are obtained in the same conditions, except that the piezoelectric translation system is deactivated.

The image B is a spatially resolved absorption map obtained by the tunable PTIR method with an acoustic modulator by laterally displacing the region of the surface of the sample illuminated by the laser source and in contact with the AFM probe and by measuring the absorption therein. This image is obtained by analyzing the high frequencies of the oscillations of the AFM lever recorded by the photodiode (generally 10 khz-2 Mhz).

The topographic maps A and C are measurements of the topography of the surface of the sample obtained by displacing the sample laterally to change the zone of contact with the AFM probe (which operates in contact mode). These images are simple measurements of the relief of the sample. They are constructed from low-frequency variations of the AFM lever recorded by the photodiode (generally <1 kHz). From the difference in the frequencies allowing the topographic and absorption images to be constructed, it is possible to obtain both types of images simultaneously.

In this embodiment, the laser source is a QCL operating with a fixed firing frequency $f_i$=1.990 MHz and a wavelength of 5.78 μm with a pulse duration of 60 ns. The test sample is produced on an epoxy matrix 31 and comprises PMMA balls 33 (large diameter) and polystyrene balls 32 (small diameter). For the images A and B, the piezoelectric translation system 21 generates a displacement in the vertical direction modulated at a frequency $f_p$=1.723 MHz. By virtue of the mix of acoustic waves, the AFM probe oscillates at the resonance frequency $f_m = f_i - f_p$=267 kHz.

In the image D, although the wavelength of the laser remains identical to that used for the image B and corresponds to an absorption band of the sample, it is impossible to work back to an absorption map of the sample without using the piezoelectric translation system. This difference therefore proves that the acoustic frequency sum works by virtue of the use of the piezoelectric translation system.

In another embodiment, the AFM probe has a different structure with a recessed lever. However, the AFM probe necessarily has a mechanical resonance and a microelectromechanical system.

In another embodiment, the detection of the displacement of the probe is performed by capacitive, piezoresistive, piezoelectric detection, by planar waveguide coupling or any other methods known to the person skilled in the art.

In another embodiment, the laser can be of any type, provided that it is possible to obtain pulses with a rate compatible with the implementation of the invention and, preferably, a certain wavelength tunability. The spectral band of emission of the laser can range from the infrared to the ultraviolet and the pulses can have any duration provided that it allows a photothermic effect to be induced.

Figure 4:
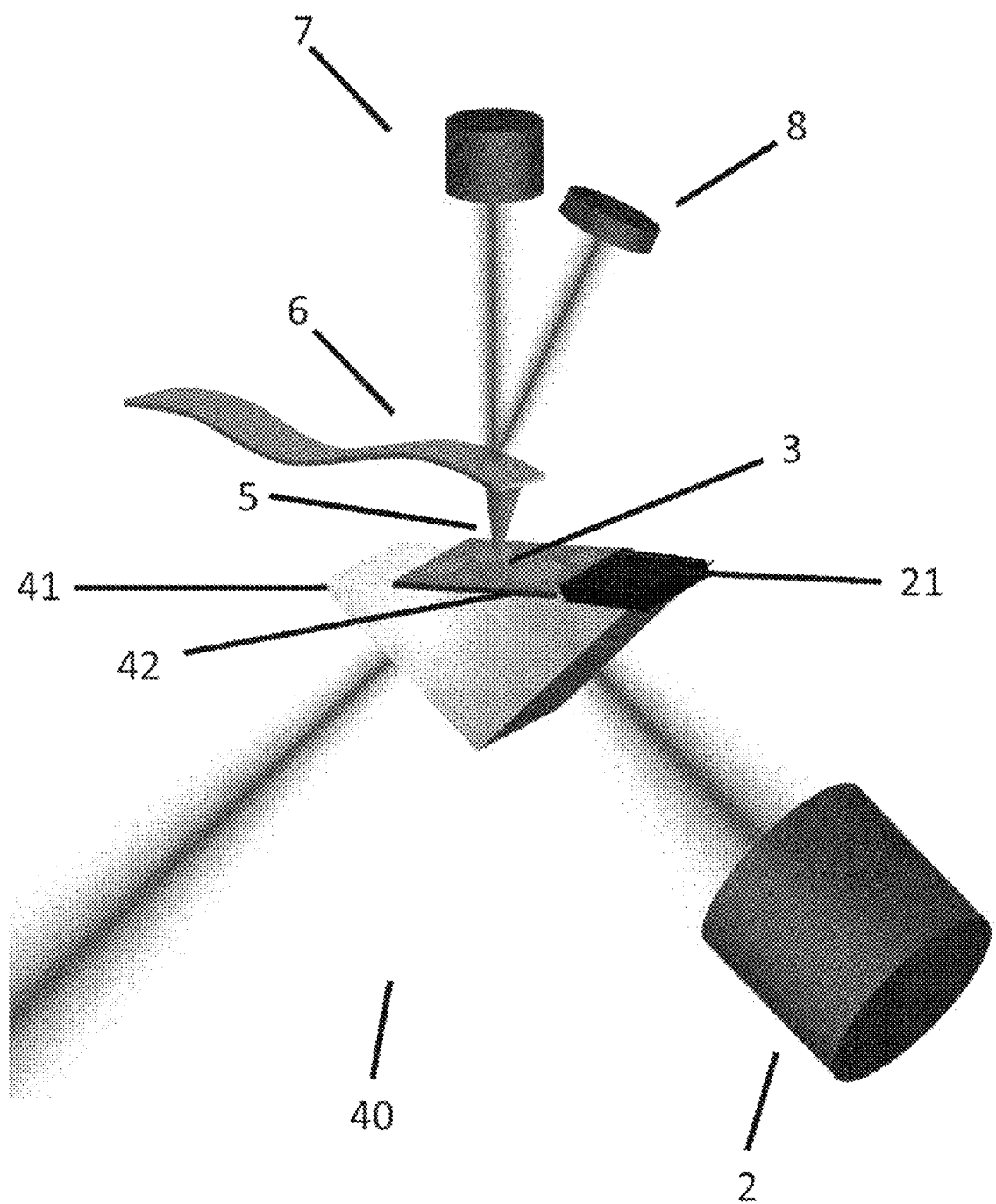
FIG. 4, a diagram of a system for measuring the absorption of a laser radiation by a sample with a nanometric or subnanometric spatial resolution according to another embodiment of the invention.

FIG. 4 illustrate a "bottom-up illumination" embodiment 40 of the invention. In the embodiment of FIG. 4, instead of being fixed to a sample-holder, the sample is deposited on the top face of a prism 41 that is transparent to the wavelength of emission of the laser 2. "Transparent" is understood here to mean a transmission greater than 50%, preferentially 75% or even preferentially 90%. This prism can, for example, be made of ZnSe. The laser beam is then directed into the prism which is arranged so as to obtain a total internal reflection of the laser beam and thus obtain a wave that is propagated in the sample and an evanescent wave in the air. By virtue of the coupling of the prism with the laser beam, a portion of the sample 42 will be exposed to the laser radiation and absorb a part of this radiation. As explained previously, this absorption will induce a thermal expansion of a region of the surface of the sample 3 which is in contact with the tip of the AFM probe. It is the propagation of the deformation induced by the photothermic effect to the surface of the sample which will induce the displacement of the AFM probe and allow the absorption to be measured. This embodiment is particularly suited to studying very thin samples (less than 1 μm). In the system 40, the illuminated sample portion 42 is situated on the face of the sample in contact with the prism and the region of the surface of the sample 3 in contact with the tip of the AFM probe is situated on the face in contact with the air, i.e. the face opposite that of the illuminated portion 42. Indeed, to obtain a nanometric resolution of the absorption of the laser radiation, it is necessary for the lighting by the evanescent wave to be able to be uniform over the entire thickness of the sample.

In the system 40, the piezoelectric translation system 21 is glued alongside the sample on the top face of the prism so as to be able to transmit the acoustic waves to the sample and make it oscillate vertically at a frequency $f_p$. In this embodiment, the piezoelectric system (21) transmits the acoustic wave both to the sample and into the prism. However, the amplitude of the acoustic waves generated is much too small to disturb the prism/laser coupling and therefore does not influence the illumination of the sample.

In another embodiment, the translation system 21 is not glued onto the top face of the prism but onto the face of the prism where the laser beam emerges after total internal reflection.

In another embodiment, the AFM probe operates in tapping or intermittent contact mode. In this embodiment, the lever is made to vibrate at a fundamental resonance frequency of the tapping mode of the probe with a certain amplitude. The tapping resonance modes have resonance frequencies that are different from the contact resonance modes because the tip is not in permanent contact with the sample in the tapping mode. When the tip interacts with the surface of the sample, the amplitude of oscillation of the lever decreases. The apparatus measures this amplitude difference, which makes it possible to obtain information on the sample to be analyzed such as its local height for example. Feedback control is then applied to adjust the height of the sample and continue the measurements in order to minimize the wear of the tip. In this embodiment, the acoustic modulation frequency $f_p$ is chosen so that the frequency $f_m = \alpha . f_p + \beta . f_l$ with $(\alpha, \beta) \in \mathbb{R}^{2*}$ and the frequency $f_p$ are equal to resonance frequencies of the tapping mode of the AFM probe.

The invention claimed is:

1. A system for measuring the absorption of a laser radiation by a sample with a nanometric or subnanometric spatial resolution comprising:
   (i) a pulsed laser source, suitable for emitting pulses at a tunable wavelength and at a repetition frequency $f_l$ and arranged so as to illuminate a portion of the sample so as to induce a thermal expansion of a region of the surface of the sample;
   (ii) an AFM probe comprising a beam bearing an AFM tip oriented in a so-called vertical direction and arranged so as to be able to be placed in contact with the region of the surface of the sample in which a thermal expansion is induced on one side and held mechanically on another side, the AFM probe having a mechanical resonance mode at a frequency $f_m$; and
   (iii) a detector configured to measure the amplitude of the oscillations of the AFM probe resulting from the absorption of the laser radiation by the region of the surface of the sample,
   wherein the system further comprises a piezoelectric translation system designed to displace the sample in said vertical direction, the displacement being modulated at a frequency $f_p$, and in that the detector is configured to measure the amplitude of a frequency component $f_m$ of the oscillations of the AFM probe, the frequency $f_p$ being chosen so as to generate oscillations of the AFM probe at the frequency $f_m$ by a mix of acoustic waves.

2. The system for measuring the absorption of a laser radiation by a sample with a nanometric or subnanometric spatial resolution as claimed in claim 1, wherein the frequency $f_p$ of modulation of the displacement of the piezoelectric translation system is the sum of or the difference between the frequencies $f_m$ and $f_l$.

3. The system for measuring the absorption of a laser radiation by a sample with a nanometric or subnanometric spatial resolution as claimed in claim 1, wherein the pulse repetition frequency $f_l$ is greater than half the mid-height spectral width of the mechanical resonance mode of resonance frequency $f_m$.

4. The system for measuring the absorption of a laser radiation by a sample with a nanometric or subnanometric spatial resolution as claimed in claim 1, wherein the pulse repetition frequency of the laser is tunable.

5. The system for measuring the absorption of a laser radiation by a sample with a nanometric or subnanometric spatial resolution as claimed in claim 1, wherein the pulsed laser source is arranged so that the portion of the sample that is illuminated includes the region of the surface of the sample in contact with the tip of the AFM probe.

6. The system for measuring the absorption of a laser radiation by a sample with a nanometric or subnanometric spatial resolution as claimed in claim 1, the pulsed laser source being arranged so that the portion of the sample that is illuminated is situated on a first face of the sample, the AFM probe being arranged so that the region of the surface of the sample in contact with the AFM probe is situated on a second face, opposite the first face.

7. A method for measuring the absorption of a laser radiation by a sample with a nanometric or subnanometric spatial resolution, the method comprising the following steps:
   a. illuminating a region of the surface of the sample with a pulsed laser source designed to emit pulses at a tunable wavelength and at a repetition frequency $f_l$;
   b. placing an AFM probe, comprising a beam having an AFM tip oriented in a so-called vertical direction on one side and held mechanically on another side, so as to be able to place the AFM tip in contact with the illuminated region of the surface of the sample on one side, the probe having a mechanical resonance mode at a frequency $f_m$;
   c. displacing the surface of the sample in said vertical direction using a piezoelectric translation system supporting the sample, the displacement being modulated at a frequency $f_p$ chosen so as to generate oscillations of the AFM probe at the frequency $f_m$ by a mix of acoustic waves, and d. detecting and measuring the amplitude of the oscillations of the AFM probe resulting from the absorption of the laser radiation by the surface.

8. The method for measuring the absorption of a laser radiation by a sample with a nanometric or subnanometric spatial resolution as claimed in claim 7, wherein the laser illuminating the region of the surface of the sample has a tunable pulse repetition frequency.

9. The method for measuring the absorption of a laser radiation by a sample with a nanometric or subnanometric spatial resolution as claimed in claim 8, wherein the steps a) to d) are reiterated by illuminating the region of the surface of the sample for successive and different pulse repetition frequencies $f_l$.

10. The method for measuring the absorption of a laser radiation by a sample with a nanometric or subnanometric spatial resolution as claimed in claim 9, wherein the steps a) to d) are reiterated by illuminating the region of the surface of the sample with successive and different illumination wavelengths to create an absorption spectrum from the measurements of the amplitude of the oscillations of the AFM probe corresponding to said successive illumination wavelengths.

11. The method for measuring the absorption of a laser radiation by a sample with a nanometric or subnanometric spatial resolution as claimed in claim 10, wherein the steps a) to d) are reiterated at different regions of the surface of the sample illuminated by the laser source to create an absorption map from the measurements of the amplitudes of the oscillations of the AFM probe, said AFM probe operating in contact mode.

12. The method for measuring the absorption of a laser radiation by a sample with a nanometric or subnanometric spatial resolution as claimed in claim 10, wherein the AFM probe operates in peak force tapping mode.

13. The method for measuring the absorption of a laser radiation by a sample with a nanometric or subnanometric spatial resolution as claimed in claim 10, wherein the AFM probe operates in intermittent contact mode.

* * * * *